United States Patent [19]

Artinyan et al.

[11] Patent Number: 5,055,192

[45] Date of Patent: Oct. 8, 1991

[54] CELL-TYPE FILTER CARTRIDGE RETAINING RING

[75] Inventors: Arto Artinyan, Southington; John Krzyston, Guilford, both of Conn.

[73] Assignee: Cuno Incorporated, Meriden, Conn.

[21] Appl. No.: 410,721

[22] Filed: Sep. 21, 1989

Related U.S. Application Data

[63] Continuation of Ser. No. 151,853, Feb. 3, 1988, Pat. No. 4,881,313.

[51] Int. Cl.⁵ .............................................. B01D 29/58
[52] U.S. Cl. .................................. 210/346; 210/486; 29/163.8
[58] Field of Search ............... 210/333.091, 333.1, 210/334, 346, 411, 486; 29/163.8

[56] References Cited

U.S. PATENT DOCUMENTS

| 445,223 | 1/1891 | Knight . | |
|---|---|---|---|
| 2,263,853 | 11/1941 | Re Qua | 210/195 |
| 2,508,976 | 5/1950 | Tessmer, Sr. | 210/346 |
| 2,568,085 | 9/1951 | Naugle | 210/333.01 |
| 2,985,308 | 5/1961 | Koupal | 210/411 |
| 3,468,296 | 4/1949 | Jacobowitz et al. | 210/195 |
| 3,522,885 | 8/1970 | Lavender et al. | 210/504 |
| 3,563,038 | 8/1971 | Healy et al. | 210/346 |
| 3,737,036 | 6/1973 | Kasten | 210/486 |
| 4,007,113 | 2/1977 | Ostreicher | 210/504 |
| 4,007,114 | 2/1977 | Ostreicher | 210/504 |
| 4,221,663 | 9/1980 | Little | 210/345 |
| 4,274,964 | 6/1981 | Krick et al. | 210/321.3 |
| 4,305,782 | 12/1981 | Ostreicher et al. | 210/503 |
| 4,309,247 | 1/1982 | Hou et al. | 162/149 |
| 4,361,486 | 11/1982 | Hou et al. | 210/501 |
| 4,617,128 | 10/1986 | Ostreicher | 210/679 |
| 4,704,207 | 11/1987 | Chu | 210/347 |
| 4,871,456 | 10/1989 | Naruo et al. | 210/346 |

*Primary Examiner*—Robert A. Dawson
*Assistant Examiner*—Wanda L. Millard
*Attorney, Agent, or Firm*—Renner, Kenner, Greive, Bobak, Taylor & Weber

[57] ABSTRACT

A cell-type filter cartridge is disclosed having netting thereon, as well as a method for producing same. Briefly stated, the surface area of filter material exposed to unfiltered fluid has disposed thereon a netting thereby preventing flaking, cracking and the like of filter media during backflow or cleaning operations. The netting is secured to the cell by a molded circumferential retainer and a circumferential centrally disposed ring.

5 Claims, 6 Drawing Sheets

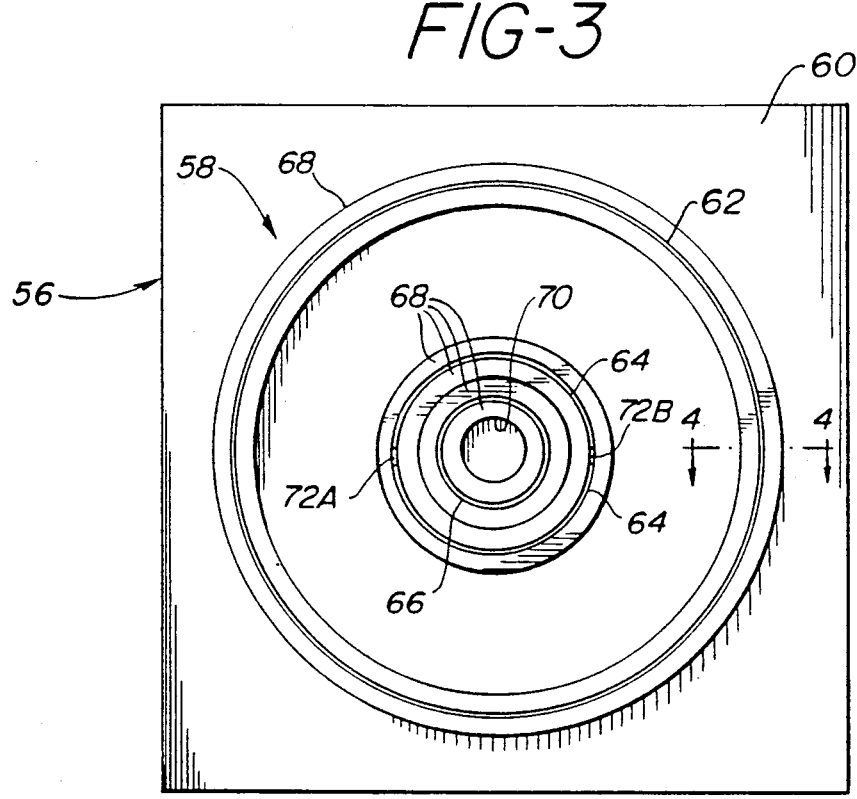
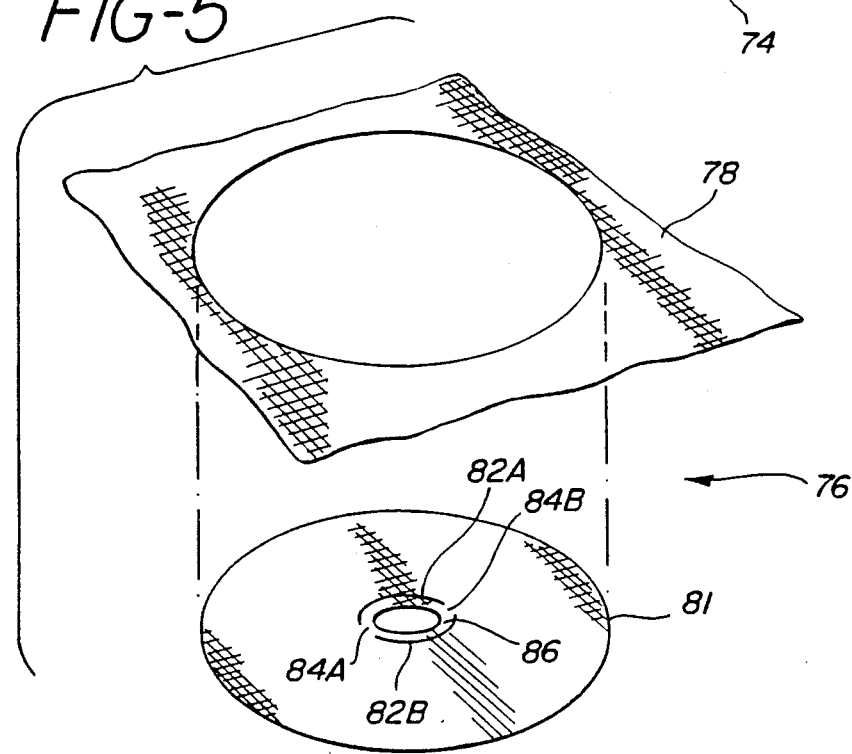

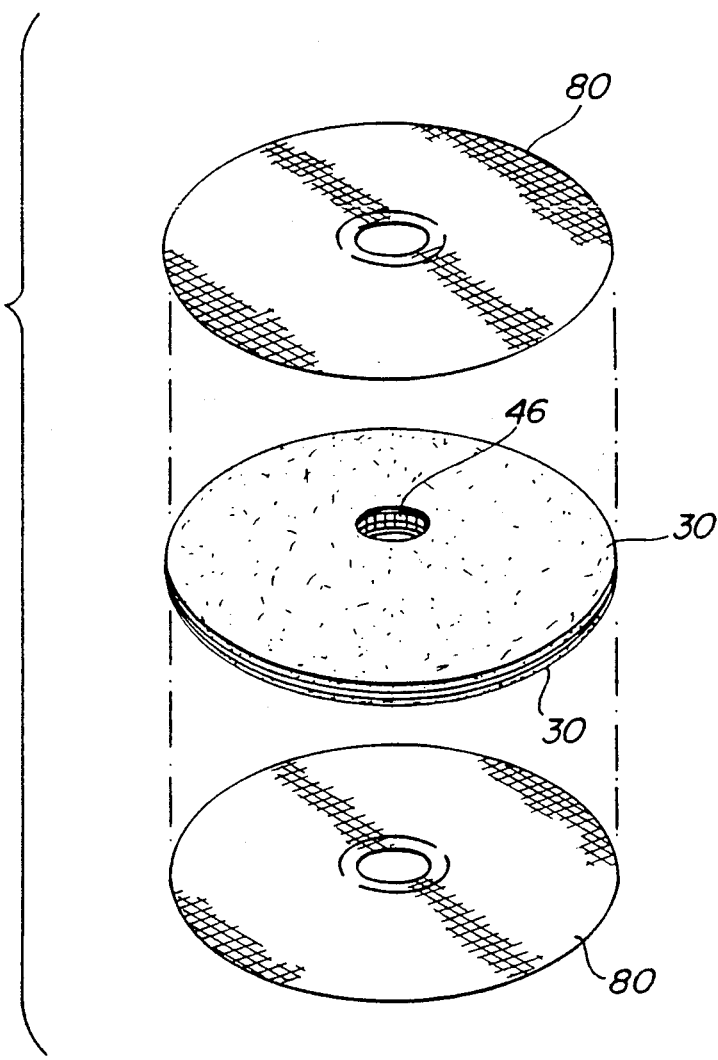
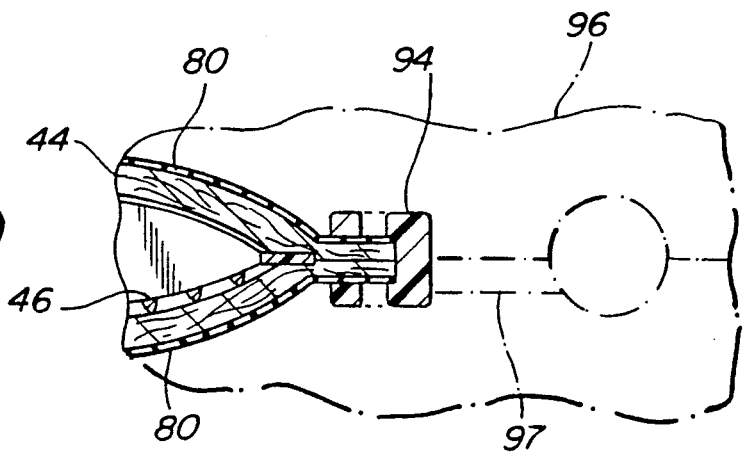

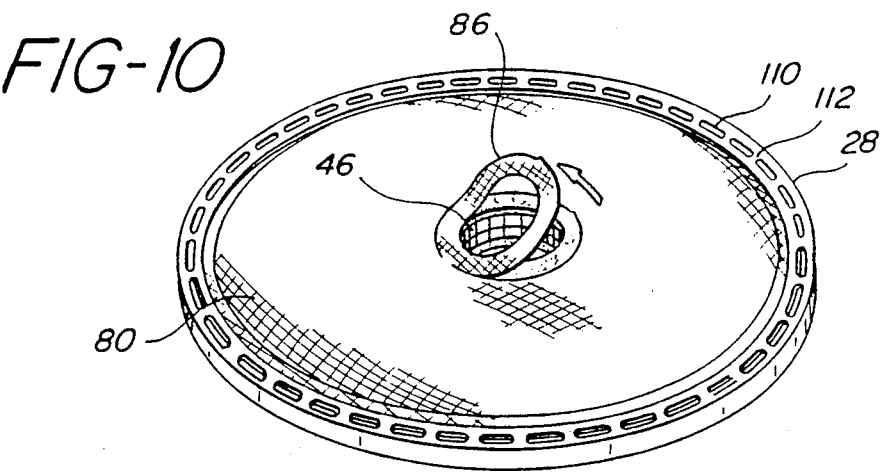
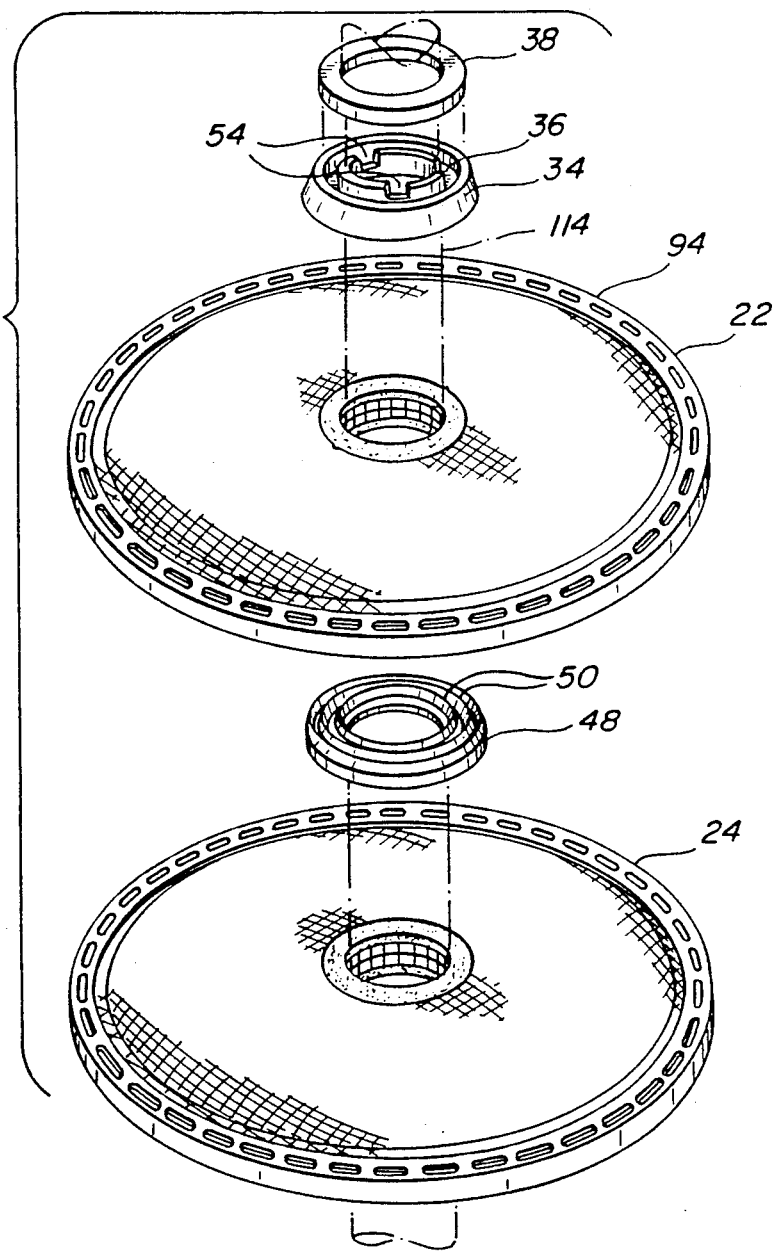

CELL-TYPE FILTER CARTRIDGE RETAINING RING

This is a continuation of co-pending application Ser. No. 07/151,853 filed on Feb. 3, 1988, now U.S. Pat. No. 4,881,313.

BACKGROUND OF THE INVENTION

1. Field of the Invention

The present invention relates, generally, to cell-type filter cartridges and more particularly to filter cartridges having a plurality of cells with netting or mesh disposed on the outside of the filter material.

2. Description of the Prior Art

Cell-type filter cartridges have long been used and are being increasingly used in a variety of situations. These type of filter cartridges are typically fabricated from individual cells generally having two layers of filter media separated from each other. Liquid would typically flow from the outside of the filter medium into the space between the layers of the filter media towards the central portion of the cell. A significant advantage to cell-type filter cartridges is that the surface area of filter material is quite large when compared to the total volume of an assembled cell-type filter cartridge.

Disposed between each filter medium is a separator which is typically formed in the shape of disks having ribs radially extending from the central aperture in a spoke-like pattern. In addition to separating the two layers of filter media, it provides for fluid flow from the filter media towards the central aperture of the filter media. An excellent example of a filter separator may be found in U.S. Pat. No. 4,783,262 to Ostreicher et al., entitled "Improved Separator for Cell Type Filter Cartridges", assigned to the same applicant as the present invention and which is specifically incorporated herein by reference. The separator disk described therein has stiffening members formed at the central aperture of the cell which are attached to a plurality of separating ribs to thereby provide a rigid, box-like structure sufficient to impart substantial cantilever strength to the ribs. Further, one of the stiffening disks is positioned proximate the ends of the separator ribs in order to act as a loadbearing surface to prevent media intrusion of the filtering medium and to prevent blocking the area of the flow path with the filtered liquid. Accordingly, one distinct advantage in this type of separator is that during backwashing or reverse flow (i.e. fluid flow from the central aperture of the filter cell out towards the surface of the filter medium) damage to the filter media is minimized or ameliorated.

Filter cell cartridges use a variety of filter media for filtering many fluids. Examples of cellulosic fibrous filter media and uses may be found, for example, in U.S. Pat. Nos. 4,617,128 "Particulate Filter Aid, Filter Bed and Process" dated Oct. 14, 1986, to Ostreicher; 4,309,247 "Filter and Method of Making Same" dated Jan. 5, 1982 to Hou et al.; 4,305,782 "Filter and Method of Making Same" dated Dec. 15, 1981 to Ostreicher et al.; 4,007,113 "Particulate Filter Medium and Process" dated Feb. 8, 1977 to Ostreicher; and 4,007,114 "Fibrous Filter Medium and Process" dated Feb. 8, 1977 to Ostreicher. All of the foregoing patents are incorporated herein by reference.

Use of a cell-type filter cartridge may be also found in U.S. Pat. No. 4,361,486 "Filter Media, Method for Oxidizing and Removing Soluble Iron, Method for Removing Inactivating Microorganisms and Particulate Filter Aid" issued Nov. 30, 1982 to Hou et al. which is incorporated herein by reference.

A process for manufacturing filter cells is described in U.S. Pat. No. 4,347,208 "Method of Making Filter Cell Having Sealed Periphery" issued Aug. 31, 1982 to Southall. In this patent, a filter cell cartridge is described which comprises a plurality of filter cells. Each of the filter cells is comprised of filter media having a conical separator therebetween with the periphery or edges of the filter cell being held together and sealed by an injection-molded flange.

Generally, all of the aforedescribed filter cartridges perform satisfactorily for their intended purpose during normal operating conditions. However, due to the inherent labor and capital costs in replacing the filter cartridge, most applications utilize a backwash or reverse flow process in order to improve volumetric fluid flow therethrough and prolong the life of the cartridge. Obviously, the more backwashing operations that are permissible, the lower the total operating costs of the system. However, during backwashing operations, many filters, including filter cell-type cartridges, experience decreased tensile strength of the media, cracking of the edge seal, masking off of the media and/or flaking off of actual filter media fibers. An illustration of this process is shown in FIG. 14 (prior art) wherein fluid, designated A, backflowing through filter media B causes shredding or flaking of the cell medium and the production of frayed edges of particles C. Another problem with filter-cell type cartridges is that unintentional backpressure applied to the filter cell may cause cell rupture and/or distortion.

A number of attempts have been made throughout the years to strengthen filters and to control the flow of fluid therethrough by the use of lattice-type structures external to the actual filter medium. An early example of this may be found in U.S. Pat. No. 445,223 entitled "Filter" issued Jan. 27, 1891 to E. M. Knight. The Knight patent utilizes a wire screen external to the filter media in order to prevent sagging of the filter media during use, the filter being partially held by the screen. The Knight patent found this feature important since the filter itself used a charcoal paste adjacent a fibrous covering and was hence "limp".

A second example may be found in U.S. Pat. No. 2,249,063 entitled "Filter Leaf" issued July 15, 1941 to Swem. This patent utilizes a wire screen to provide structural support to the filter media under the high operating temperature and pressure utilized.

Another example may be found in U.S. Pat. No. 2,263,853 entitled "Filter" issued Nov. 25, 1941 to Re Qua. This patent utilizes a metal ribbon twisted about its longitudinal axis in order to support the filter media. Additionally, a supporting screen was utilized which is simultaneously welded at diametrically opposed points on the ribbon.

In U.S. Pat. No. 4,274,964 "Dialysator" issued June 23, 1981 to Krick et al. A membrane-type hose in conjunction with an intermediate netting layer is used in an interlocking manner for the purpose of providing an improved flow pattern.

Accordingly, the above-mentioned patents use a support of one kind or another for the express purpose of providing a stiff filter support for the "limp" filter during use, i.e. the supports in effect form for filter elements which, by themselves, lack the appropriate physical properties. As such, the prior art braces or nets are used with filters specifically for the purpose of supporting the filter during forward fluid flow conditions as distinct from dealing with the problem of masking off, flaking off of actual filter media fibers, cracking at the edge seal and distortion caused by backwashing and backflow conditions and other related problems. In effect, the problem to be solved by the present invention is not one of physical integrity during normal operation and use, but rather the reverse of maintaining physical integrity where fluid is flowing contrary to normal flow as during backwashing operations or unintentional backpressure.

SUMMARY OF THE INVENTION

In order to overcome the difficulties encountered in the prior art, the present invention sets forth an improved cell-type filter cartridge in which the individual cells have a mesh or netting on the exterior thereof. The coaction of the mesh with the filter medium increases the tensile strength of the media when wet so that it can resist back pressure and/or back-washing as well as providing other benefits.

It is also an object of the present invention to produce a cell-type filter having a molded edge, preferably an injection-molded edge, which resiliently engages and holds the netting tightly to the exterior of the filter medium and which also sealingly compresses the outer edge of the two filter media halves together thereby forming a cell.

It is yet a further object of the present invention to produce a device wherein cracking at the edge seals of the filter cell is minimized.

It is another object of the present invention to provide a method for manufacturing and assembling improved filter cell cartridges.

It is still a further object of the present invention to provide a filter cell cartridge having an improved aesthetic appearance. It is yet another object of the present invention to provide a filter cell cartridge which does not prematurely fail and which does not aesthetically indicate failure when, in effect, the filter cartridge is still serviceable.

It is yet a further object of the present invention to provide a cartridge-type filter cell having an inexpensive netting thereon wherein the cell is simple to manufacture and the netting does not detrimentally affect the fluid throughput in the cell.

It is a further object of this invention to provide a filter cell assembly which does not blind or close itself off as readily as prior art devices and prior construction forms, i.e. better utilization of total surface area and extended life.

It is still a further object of this invention to provide a filter cell wherein fluid flow is directed across the exterior of the surface by parallel channels formed by the netting, thereby enhancing flow distribution and full utilization of the filter surfaces.

It is another object of the present invention to produce a filter cell cartridge having a plurality of annular filter cells which are axially disposed with respect to each other, each filter cell being comprised of a first annular filter medium arranged so as to have an unfiltered fluid side and a filtered fluid side, the filter medium having a centrally disposed aperture therethrough, a second annular filter medium arranged so as to have an unfiltered fluid side and a filtered fluid side and having a centrally disposed aperture therethrough, the filtered fluid side of the second filter medium being disposed so as to be adjacent and coextensive with the filtered fluid side of the first filter medium, a means for separating the filtered fluid side of the first and second filter media, annular netting coextensive and coacting with the unfiltered fluid side of the first and second filter media, the netting coacting to minimize flaking during forward flow and minimizing damage, bursting and distortion back-flow and backwash condition, a spacer disposed between adjacent filter cells and coextensive with the aperture in the filter cells, a first retainer ring assembly disposed on the unfiltered fluid side of the first of the plurality of filter cells, and a second retainer ring assembly disposed on the unfiltered fluid side of the last of the plurality of filter cells, the retainer rings maintaining the position of the netting.

It is a further object of this invention to provide a filter cell wherein the media has enhanced mechanical strength, e.g. tensile, burst strength, and shear strength over prior art media.

It is still another object to provide a filter cell having netting thereon which acts as a spacer for improved fluid flow between adjacent cells.

These as well as other object and advantages will be apparent from the description of the invention and the novel features will be particularly pointed out hereinafter in the claims.

BRIEF DESCRIPTION OF THE DRAWINGS

Reference may be now had to the accompanying drawings in which:

FIG. 3 is an overview of the mesh-cutting guide utilized in the present invention;

FIG. 4 is a cross-sectional view taken through one of the blades shown in FIG. 3;

FIG. 5 is an illustrative view of a cut netting blank as utilized in the present invention;

FIG. 6 is a partially exploded view of the netting utilized in the present invention adjacent the filter portion of a filter cell;

FIGS. 8 and 9 are cross-sectional views illustrating injection-molding and the mold respectively of the sealed periphery of an individual filter cell;

FIGS. 10 and 11 illustrate an assembled filter cell and assembly of a filter cell cartridge of the present invention;

DETAILED DESCRIPTION OF THE PREFERRED EMBODIMENT

Figure 1:
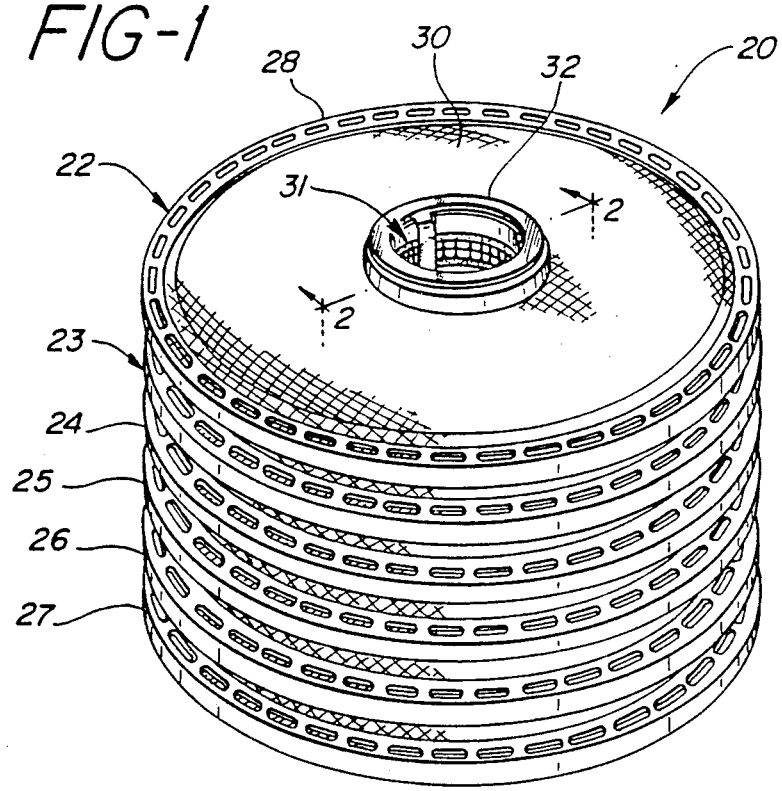
FIG. 1 is a perspective view of the filter cell cartridge assembly of the present invention.

Referring now to FIG. 1, there is shown a reinforced filter assembly 20 which is comprised of a plurality cells 22-27, vertically stacked one upon the other. Disposed along the circumference of each filter cell is an edge 28 which is utilized to retain the various components of each individual cell together, as described more fully below. A relatively large filtration area 30 is used for the introduction of unfiltered fluid (not shown) therethrough which exits through the center aperture or core 31. Disposed at either end of the assembly 20 is an retainer ring assembly 32. The entire filter assembly 20 is disposed inside a chamber (not shown) having an unfiltered fluid inlet for the chamber and a filtered fluid outlet connected to one or both retainer ring assemblies 32.

Figure 2:
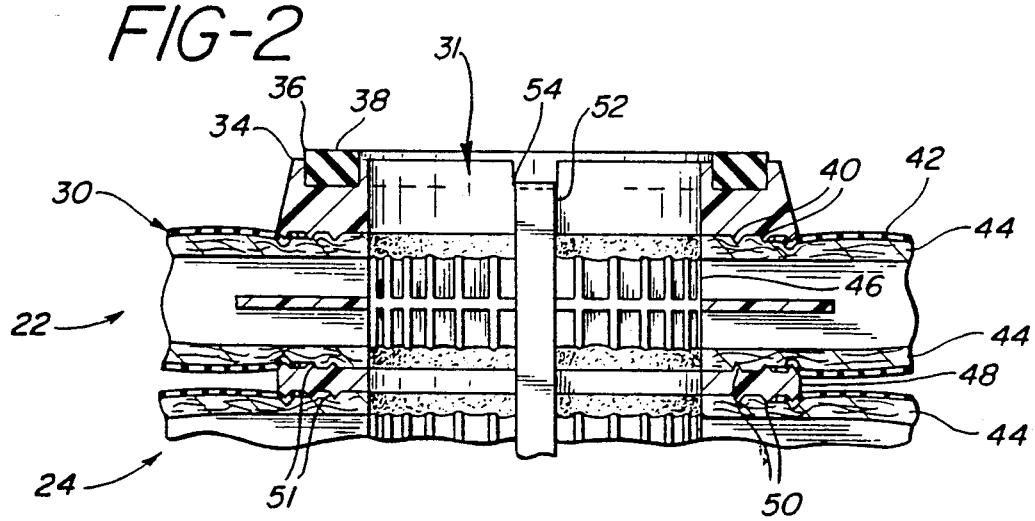
FIG. 2 is a cross-sectioned elevational view taken through FIG. 1 along 2—2.

Referring now to FIG. 2, there is shown a cross-sectional view taken through a portion of the filter cell assembly shown in FIG. 1. A retainer ring assembly 32 is disposed at either end of the filter assembly 20. Retainer ring assembly 32 is comprised of an end fitting 34 having an annular slot 36 therein. Disposed in the annular slot 36 is a gasket 38 which coacts with an annular outlet conduit (not shown) thereby preventing the migration of unfiltered fluid adjacent the filtration area 30 into the central aperture or core 31. A plurality of filter assemblies may be disposed inside a chamber in stacked relationship thereto, thereby allowing replacement of groups of filter assemblies (not shown). A plurality of annular ribs 40 are disposed on the underside of end fitting 34 and provide a fluid-tight fitting between the end fitting 34 and the surface of the filtration area 30, while holding and retaining mesh 42 thereon. Optionally, the mesh 42 may be sealed, e.g. ultrasonically welded, to end fitting 34.

Still referring to FIG. 2, filter cell 22, 24 is comprised of netting 42 disposed on the outer surfaces thereof. The netting is preferably a mesh of the desired thickness and mesh size sufficient to withstand the forward and backward fluid flow requirements and provide for relatively undiminished fluid flow therethrough while preventing flaking and the like. Hence, this netting supplements, enhances or increases the tensile strength of the filter medium 44 when wet. Generally, any type of netting or mesh may be used which is pervious to flow. It is preferred however to use a polymeric mesh or netting, e.g. polypropylene. It is also preferred to have a rigidized netting or mesh which forms parallel fluid flow channels tangential to the media. A filter material separator 46 is disposed between each of the two adjacent layers of filtration material 44. The separator 46 is utilized to prevent collapse of the filter cell in use and provide integrity to each individual filter cell while providing relatively unimpeded fluid flow therethrough. Further, it has been observed that for "dense" filter cell cartridges when cell-to-cell spacing is minimal, the netting 42 acts as a separator between adjacent cells and therefore aids in fluid flow along the surface.

Disposed between each cell is an inter filter cell spacer 48. The spacer 48 is preferably comprised of the same material as the retainer ring assembly 32. The spacer 48 has a plurality of annular recesses 50 and ridges 51 disposed on both sides. It is preferable that at least two ridges 51 are utilized (and hence two recesses 50) to form a fluid-tight seal between adjacent filtration material disposed on adjacent filter cells. Since the netting has a plurality of apertures therethrough, it has been found that two annular ridges are usually necessary to prevent migration of unfiltered fluid along the netting 42 into the central aperture or core 31.

A plurality of bands 52 engage slots 54 in the retainer ring assembly 32 and extend from the retainer ring assembly at one end to the retainer ring assembly at the other end and are used to form a rigid filter cell assembly 20. The bands 52 are preferably of stainless steel, although any other suitable material may be utilized. Further, it is possible to utilize a plurality of threaded bolts or the like extending through the filter cell assembly and suitably attached to the retainer ring assemblies 32 in order to form a rigid assembly.

Referring now to FIG. 3, there is shown a top view of a cutting die utilized in the present invention. A netting cutting die, indicated generally at 56, is utilized to cut netting 56 into the appropriate configuration. The cutting die 56 is comprised of a cutting area, shown generally at 58, disposed on a base 60. Three cutting blades are disposed on the base 60. An outer circumference cutting blade 62 is utilized to cut the outer diameter of the netting to the approximate size of the filter cell with which it is to be used. Radially inward is disposed an additional cutting blade, designated 64. Another blade is shown at 66 and is an inner circumference cutting blade. Disposed between adjacent blades are spacers 68 (shown more clearly in FIG. 4) which are preferably of a sponge-type material to provide some backing to the netting during the cutting operation so that cutting is more uniform along the annular edge of the blade and to free the netting from the die after being cut. The inner circumference cutting blade has axially disposed therein a centering hole 70 which is used for alignment or registration purposes in cutting the netting. Several non-cutting portions, designated respectively as notches 72A, 72B, are disposed on cutting blade 64. Each cutting blade is generally a thin sheet stock bent into an annular configuration having one end sharpened so as form blade tip 74.

Referring to FIG. 5, use of the cutting die 56 is more clearly illustrated via a representation of how the netting utilized is cut. The netting blank, shown generally at 76, is larger than the desired area required. The netting is placed onto the cutting die 56 thereby forming the appropriate cuts resulting in a number of portions. These portions include discard material 78 and filter netting 80 which is material that is actually used with the filter cell. The cutting blade 64 results in respectively netting flaps 82A, 82B which remain attached to the netting via netting notches 84A, 84B. This therefore results in a frangible type of plug/donut 86. It has been found that it is necessary to produce the donut-type structure 86 in order to facilitate assembly of each filter cell. More particularly, the center aperture is utilized to center the netting with respect to the filtration material during the actual assembly.

Figure 7:
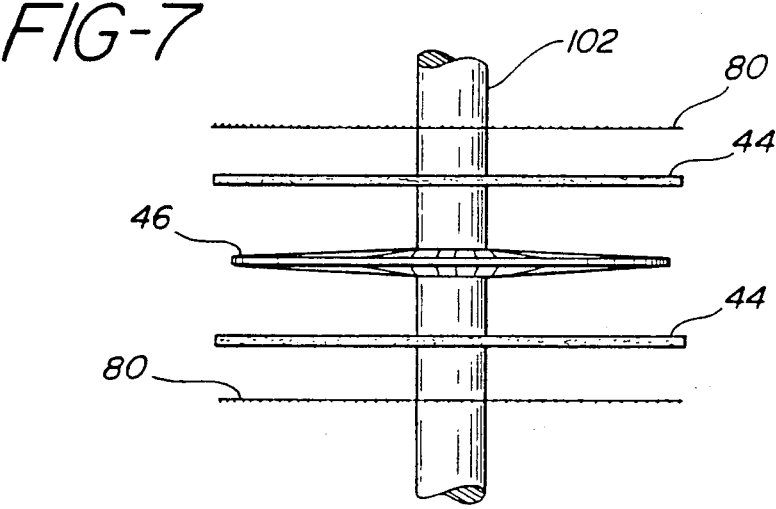
FIG. 7 is a side elevational view showing assembly of the individual components comprising a filter cell.

Referring to FIG. 7, preliminary alignment and assembly of a filter cell is shown. More specifically, a cell assembly mandrel 102 is utilized to align the various components of a filter cell. Initially placed onto mandrel 102 is a filter material separator 46. On either side of separator 46 is the filtration material 44, followed by filter netting 80. This forms the assembly shown in FIG. 6 (without the mandrel 102).

Figure 8:
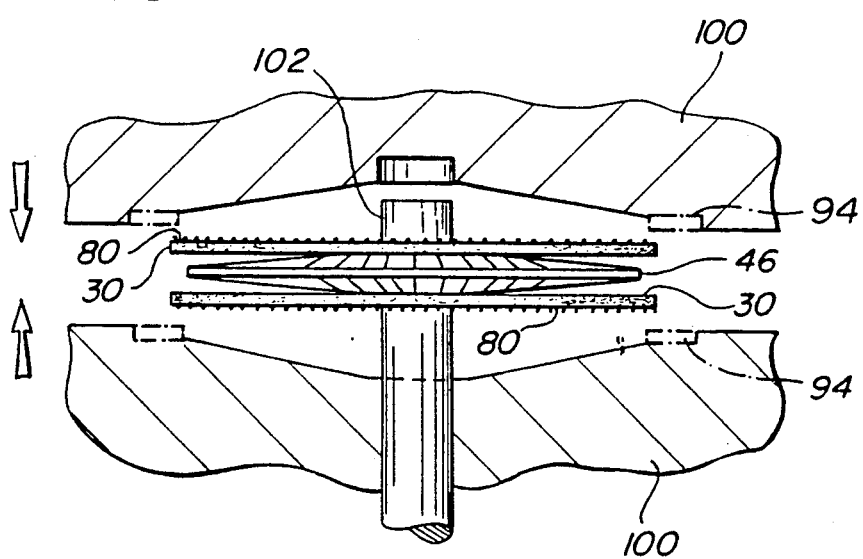

Molding of the edge 28 on each filter cell is accomplished as shown in FIGS. 8 and 9. There, a cell assembly press 100 disposed on mandrel 102 (or any other suitable or subsequent mandrel) and comprised of essentially two halves are axially urged along mandrel 102 towards each other until mated as shown in FIG. 9. This causes the edge of netting 80 to be compressed against filtration material 44. A cavity, as part of injection mold 96 contained on cell assembly press 100, is configured so as to be in the shape of edge 28 along the annular edge of the compressed filter cell. Molten material is then injected through sprue 97, of die 96, and enters into cavity 94 so as to form edge 28. In the preferred embodiment of the present invention, the edge material is the same as retainer ring assembly 32 and inter filter cell spacer 48, although any other suitable type of material may be utilized. The press 100 is remained closed until sufficient cooling of the injected material is accomplished after which time the mold is then separated and the filter cell removed from mandrel 102. The netting 80 thus becomes sealed to and/or an integral part of the edge seal 28.

Referring now to FIGS. 10 and 11, final construction of a filter cell assembly is shown. The edge 28, as mentioned, is comprised of plastic and has a plurality of elongate slots or apertures 110 having spacer portions 112 disposed therebetween. After the molding process shown by FIGS. 8 and 9, the plug or donut 86 is removed as shown. In order to facilitate removal of the plug or donut 86, netting notches 84A and 84B are utilized. Therefore it is possible to merely pull on donut 86 in order to remove it from the netting 80 without performing a further cutting operation. The inner diameter of the plug or donut 86 is only used for centering purposes about mandrel 102 during preliminary assembly steps and is removed prior to construction of the filter cell assembly 20.

Actual assembly of the filter cell assembly is accomplished by use of a filter assembly mandrel 114, which is utilized to properly align the various components in the filter cell assembly. An inter filter cell spacer 48 is placed between adjacent filter cells 22, 24. On the outside of the end filter cells there is an end fitting 34 having a gasket 38 therein. Thereafter, the mandrel 114 is removed and the bands 52 are placed into slots 54, compressing the cells and components thereof to thereby form a rigid cohesive filter cell assembly structure 20 wherein retainer rings 34 and separators 48 are urged against the filter media and netting to thereby seal the central core 31.

Figure 12:
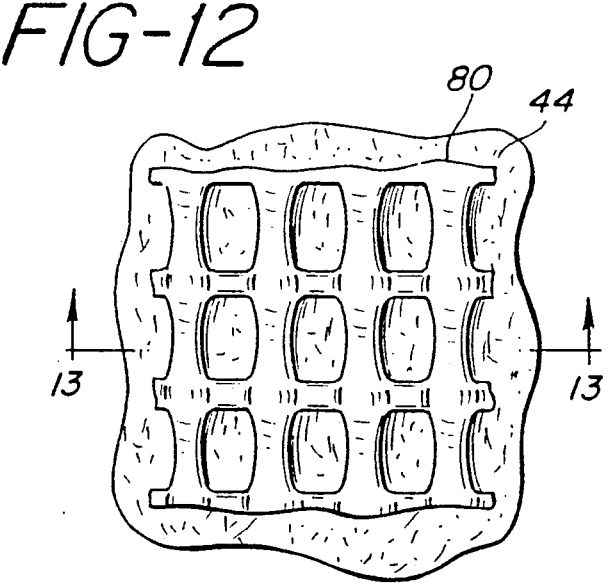
FIGS. 12 and 13 illustrate a plan and cross-sectional view respectively of the netting and filter media utilized in the present invention.
Figure 13:
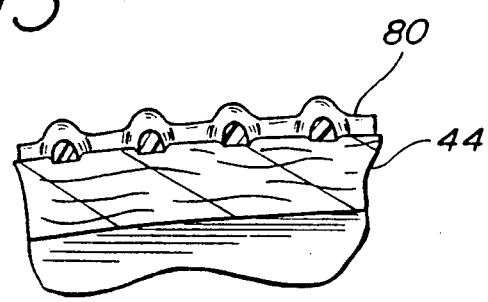
Figure 14:
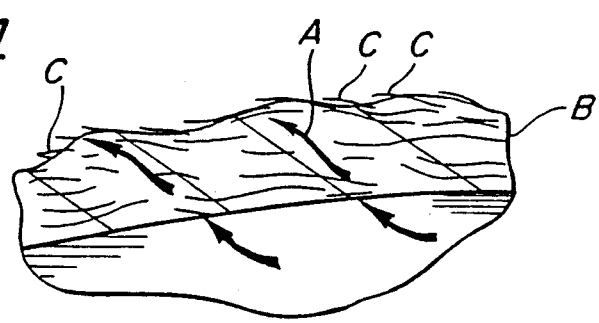
FIG. 14 shows typical filter media of prior art filter cell cartridges.

Referring now to FIGS. 12 and 13, top and cross-sectional views of filter netting 80 overlaid onto filtration material 44 are shown. The netting 80 may have a relatively smooth or planar undersurface to contact the filtration material 44 or may protrude into the filter media. Both types of netting minimize cracking, flaking and the like. The netting holds down the filtration material 44 to the maximum extent possible without impeding fluid flow therethrough.

Tests were conducted to compare the present invention with prior art filter cell designs. These tests produced the following results:

| Type of Cell | Back Pressure Test Burst Pressure (PSI) |
| --- | --- |
| Standard/Prior art | 1.5–3.0 |
| Reinforced with netting | 16.0–22.0 |

Further, while a number of different types of netting were tried, type no. XN 7020 manufactured by Conwed Plastics of Minneapolis, Minn., were found to produce the best results. However, other types of netting produced by Conwed Plastics, such as part numbers XN 7025, XN 4210, XN 4700 and XN 3900 are workable. The first two of these part numbers respectively performed most satisfactorily and had a strand configuration of 7 by 5 and are a standard resin PP/PE blend. However, it is to be understood that other reinforced netting produced by other manufacturers is acceptable as individual circumstances dictate.

It is to be remembered that many variations of the present invention may be practised without departing from the spirit and scope of the present invention. For example, the filter cells may be of different configurations, such as cylindrical, while different edge-type mechanisms may be utilized. Further, different types of materials may be utilized while different methods of assembly may similarly be used. Additionally, it is envisioned that it is possible to place the netting on the interior of the filter cell adjacent the filtration material so as to prevent flaking, cracking and the like during filter operation without departing from the spirit and scope of the present invention.

Accordingly, the present invention produces an improved cell-type filter cartridge having an injection-molded edge which resiliently engages and holds reinforced netting tightly to the filter medium. A method of manufacturing is provided for assembling the improved filter cell cartridges so as to minimize leakage and produce an aesthetically improved filter cell which does not prematurely fail or aesthetically indicate failure. The present invention also produces an inexpensive means for improving the physical and aesthetic characteristics of a filter cell by use of a netting which minimizes the frequency at which the filter cell blinds or closes itself off while increasing mechanical and tensile strength as well as burst strength and the like.

Having thus described the present invention in detail, it is to be understood that the foregoing description is not intended to limit the spirit and scope thereof. What is desired to be protected by Letters Patent is set forth in the appended claims.

What is claimed is:

1. A sealing disk for a filter cell having a fibrous filter media and netting disposed on the unfiltered fluid surface thereof, comprising:
   a disk having at least one radial surface;
   an aperture axially disposed in the disk;
   a plurality of concentric sealing rings extending from the radial surface, the concentric rings constructed and arranged to sealingly engage the surface of abutting fibrous filter media; and
   a fastening ring concentrically disposed about the plurality of sealing rings, constructed and arranged to engage the reinforcing netting disposed on the fibrous filter media.

2. A sealing disk according to claim 1, wherein the disk has opposing radial surfaces.

3. A sealing disk according to claim 1, wherein the plurality of concentric sealing rings and the fastening ring extend from each of the radial surfaces.

4. A sealing disk according to claim 1, wherein each of the sealing rings is continuous.

5. A sealing disk according to claim 1, wherein each of the sealing rings is triangularly shaped in cross-section to form an engaging edge.

* * * * *